United States Patent
Li et al.

(10) Patent No.: US 10,111,250 B2
(45) Date of Patent: Oct. 23, 2018

(54) METHODS AND APPARATUSES FOR COORDINATING RESOURCE SCHEDULING BETWEEN WIRELESS NETWORKS

(71) Applicant: Telefonaktiebolaget LM Ericsson (publ), Stockholm (SE)

(72) Inventors: Gen Li, Beijing (CN); Tim Irnich, Neuss (DE); Cong Shi, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 134 days.

(21) Appl. No.: 15/111,166

(22) PCT Filed: Jan. 21, 2014

(86) PCT No.: PCT/CN2014/070999
§ 371 (c)(1),
(2) Date: Jul. 12, 2016

(87) PCT Pub. No.: WO2015/109441
PCT Pub. Date: Jul. 30, 2015

(65) Prior Publication Data
US 2016/0338098 A1   Nov. 17, 2016

(51) Int. Cl.
*H04W 74/04* (2009.01)
*H04W 28/16* (2009.01)
(Continued)

(52) U.S. Cl.
CPC .......... *H04W 74/04* (2013.01); *H04W 16/10* (2013.01); *H04W 16/14* (2013.01); *H04W 28/16* (2013.01)

(58) Field of Classification Search
None
See application file for complete search history.

(56) References Cited

U.S. PATENT DOCUMENTS

2010/0267408 A1   10/2010  Lee et al.
2010/0309869 A1*  12/2010  Kim .................... H04W 76/066
                                                 370/329
(Continued)

FOREIGN PATENT DOCUMENTS

CA       2848413 A1    4/2013
CN     101296475 A    10/2008
(Continued)

OTHER PUBLICATIONS

Klotz, Walter, "Graph Coloring Algorithms," Mathematics Report, vol. 5, 2002, Technical University Clausthal, pp. 1-9.
(Continued)

*Primary Examiner* — Ahn Ngoc M Nguyen
(74) *Attorney, Agent, or Firm* — Withrow & Terranova, PLLC

(57) ABSTRACT

Methods and apparatuses for coordinating resource scheduling between wireless networks are provided. The method comprises receiving a resource coordination request message from at least one wireless network, wherein the resource coordination request message includes identifiers of at least one pair of wireless links which include an interfered wireless link in the at least one wireless network and an interfering wireless link in a second wireless network. The method also comprises performing coordination about schedulable resources for the interfered wireless link and the interfering wireless link based on the resource coordination request message. The method further comprises transmitting a coordinated schedulable resource message to the at least one wireless network and the second wireless network such that at least one of the interfered wireless link and the interfering wireless link is scheduled according to the coordinated schedulable resource message.

18 Claims, 10 Drawing Sheets

(51) Int. Cl.
*H04W 16/14* (2009.01)
*H04W 16/10* (2009.01)

(56) References Cited

U.S. PATENT DOCUMENTS

| | | | |
|---|---|---|---|
| 2010/0329113 A1* | 12/2010 | Madan | H04L 5/0037 370/230 |
| 2011/0310830 A1 | 12/2011 | Wu et al. | |
| 2012/0236731 A1* | 9/2012 | Beaudin | H04W 72/082 370/248 |
| 2013/0308524 A1* | 11/2013 | Tavildar | H04W 72/1242 370/328 |
| 2013/0322374 A1 | 12/2013 | Cai | |
| 2014/0226504 A1 | 8/2014 | Tavildar et al. | |
| 2015/0031284 A1* | 1/2015 | Pitakdumrongkija | H04W 16/26 455/9 |
| 2015/0249530 A1 | 9/2015 | Zhang et al. | |
| 2016/0353347 A1 | 12/2016 | Jun et al. | |

FOREIGN PATENT DOCUMENTS

| | | |
|---|---|---|
| CN | 102026275 A | 4/2011 |
| CN | 102438271 A | 5/2012 |
| CN | 102484575 A | 5/2012 |
| CN | 102573039 A | 7/2012 |
| CN | 102833760 A | 12/2012 |
| CN | 103202056 A | 7/2013 |
| EP | 2040503 A1 | 3/2009 |
| EP | 2663112 A1 | 11/2013 |
| EP | 2675225 A1 | 12/2013 |
| WO | 2011020062 A2 | 2/2011 |
| WO | 2011119750 A1 | 9/2011 |
| WO | 2013127310 A1 | 9/2013 |
| WO | 2014047838 A1 | 4/2014 |
| WO | 2015109439 A1 | 7/2015 |
| WO | 2015154363 A1 | 10/2015 |

OTHER PUBLICATIONS

International Search Report and Written Opinion for International Patent Application No. PCT/CN2014/070997, dated Oct. 28, 2014, 8 pages.
International Search Report and Written Opinion for International Patent Application No. PCT/CN2014/084640, dated Jan. 8, 2015, 8 pages.
Aydin, Osman et al., "Deliverable D4.1: Summary on preliminary trade-off investigations and first set of potential network-level solutions," Document No. ICT-317669, Project Name: Mobile and wireless communications Enablers for the Twenty-twenty Information Society (METIS), Version: 1, delivered Sep. 30, 2013, METIS 2020 Project, 97 pages.
Extended European Search Report for European Patent Application No. 14880271.3, dated Sep. 26, 2017, 6 pages.
International Preliminary Report on Patentability for International Patent Application No. PCT/CN2014/070999, dated Aug. 4, 2016, 6 pages.
Extended European Search Report for European Patent Application No. 14880358.8, dated Sep. 26, 2017, 8 pages.
International Preliminary Report on Patentability for International Patent Application No. PCT/CN2014/070997, dated Aug. 4, 2016, 6 pages.
International Preliminary Report on Patentability for International Patent Application No. PCT/CN2014/084640, dated Oct. 20, 2016, 6 pages.
Notice of Allowance for U.S. Appl. No. 15/111,171, dated Feb. 20, 2018, 10 pages.
Nokia Siemens Networks, "R3-103555: On X2 signaling for TDM eICIC in Macro+Pico scenarios," Third Generation Partnership Project (3GPP), TSG RAN WG3 Meeting #70, Nov. 15-19, 2010, 4 pages, Jacksonville, USA.
Extended European Search Report for European Patent Application No. 14888742.5, dated Nov. 28, 2017, 8 pages.
Non-Final Office Action for U.S. Appl. No. 15/127,933, dated Sep. 7, 2018, 12 pages.

* cited by examiner

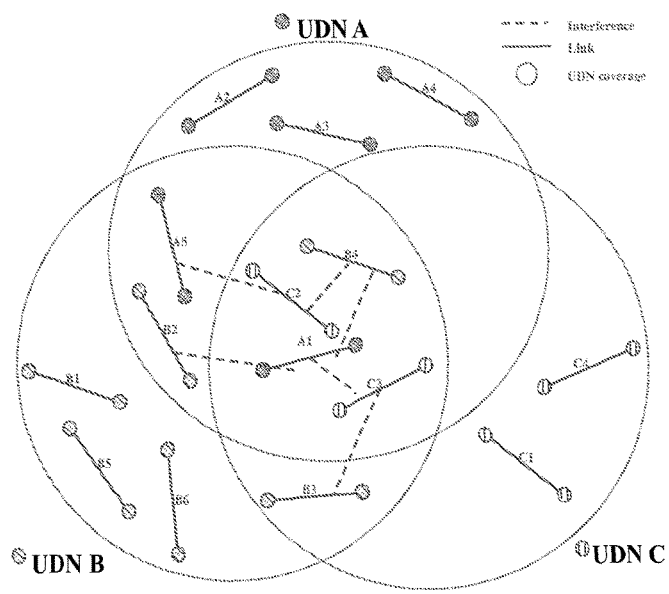
FIG. 6A
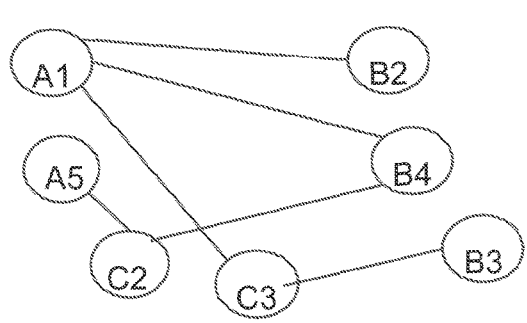
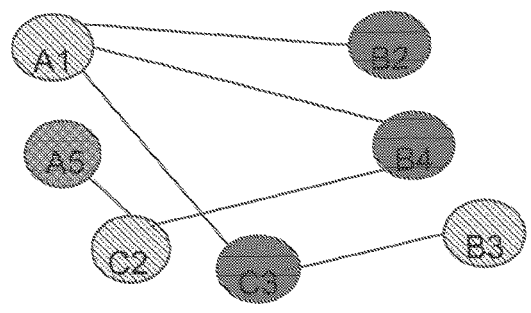
FIG.6B  FIG.6C

METHODS AND APPARATUSES FOR COORDINATING RESOURCE SCHEDULING BETWEEN WIRELESS NETWORKS

This application is a 35 U.S.C. § 371 national phase filing of International Application No. PCT/CN2014/070999, filed Jan. 21, 2014, the disclosure of which is incorporated herein by reference in its entirety.

TECHNICAL FIELD

The non-limiting and exemplary embodiments of the present disclosure herein relate to a wireless communication field. In particular, the embodiments herein relate to methods and apparatuses for coordinating resource scheduling between two or more wireless networks which operate on the same or overlapping radio resources.

BACKGROUND

With the rapid evolution of the wireless communication technique and increasing requirements for traffic throughput, a new type of network architecture, also known as an Ultra-Dense Network ("UDN"), has been proposed. The UDN is predominantly expected to be deployed in a form of "coverage islands" serving relatively small areas (e.g., an office building, a shopping mall, etc.). In general, a particular area is expected to be served by one UDN only, i.e., although possible, parallel deployments of multiple UDNs are considered unlikely. Adjacent or spatially separated UDN deployments are expected to be relatively well-isolated due to large radio propagation losses. This may be due to the fact that UDNs are expected to operate on high frequencies, e.g., in 10-100 GHz. It is therefore generally desirable to enable UDNs to utilize the full available bandwidth in a given frequency band in order to maximize the peak data rate and capacity, as opposed to the today's dominant practice of partitioning a frequency band in multiple frequency blocks assigned to only one network. For a better understanding of the UDN, the following will describe some operational details in reference to FIG. 1, which schematically illustrates a scenario for inter-UDN co-channel spectrum sharing.

First, it is assumed that there are two UDNs deployed in an open office as shown in FIG. 1, wherein the first UDN comprises an access node ("AN") 1, an aggregation node ("AGN") 1 which is a special AN and has a wired connection to a core network, a terminal device ("TD") 1 and a TD 3 and the second UDN comprises ANs 2 and 3, TDs 2 and 4, and an AGN 2. It is further assumed that the first UDN and the second UDN are owned by different operators. Under this network architecture and deployment, a TD, when moving around within the coverage of a single UDN, can only access to different ANs belonging to the same operator. For example, although the AN 2 is further from the TD 2 than the AN 1, the TD 2 would have to access to the AN 2 rather than the AN 1 due to the same operator. Likewise, the TD 3 would access to the AN 1 rather than the AN 2. In this situation, when the adjacent, neighboring or perhaps partly overlapping UDNs 1 and 2 share the same frequency channel or operate on overlapping frequency channels, it is very likely that interference may arise between the nodes in UDNs 1 and 2, e.g., the interference between the wireless link 1 from the UDN 1 and the wireless link 2 from the UDN 2, as illustrated in FIG. 1. The impact of such inter-network interference on the wireless link quality may not be ignorable and would become more serious when a great number of the TDs are moving across the overlapping area of the different UDNs owned by respectively different operators.

SUMMARY

It is an object of the present disclosure to address the problems outlined above, and to provide a solution for coordinating resource scheduling between two or more wireless networks, such as the UDNs as discussed above. This object may be obtained by providing methods and apparatuses as follows.

According to an aspect of the present disclosure, there is provided a method for use in a wireless network for coordinating resource scheduling between two or more wireless networks which operate on same or overlapping radio resources, wherein each wireless network comprises one or more radio access nodes and one or more terminal devices connected thereto. The method comprises receiving a resource coordination request message from at least one wireless network, wherein the resource coordination request message includes identifiers of at least one pair of wireless links which include an interfered wireless link in the at least one wireless network and an interfering wireless link in a second wireless network. The method also comprises performing coordination about schedulable resources for the interfered wireless link and the interfering wireless link based on the resource coordination request message. The method further comprises transmitting a coordinated schedulable resource message to the at least one wireless network and the second wireless network such that at least one of the interfered wireless link and the interfering wireless link is scheduled according to the coordinated schedulable resource message.

In one embodiment, the receiving the resource coordination request message comprises receiving the resource coordination request message when interference caused by the interfering wireless link on the interfered wireless link exceeds a pre-determined threshold.

In another embodiment, the coordinated schedulable resource message indicates which radio resources are schedulable to at least one of the interfered wireless link and the interfering wireless link and wherein the radio resources schedulable to the interfered wireless link and the radio resources schedulable to the interfering wireless link are at least partially orthogonal to each other.

In an additional embodiment, the performing coordination about the schedulable resources comprises updating previously-stored link pair information by adding the identifier of at least one of the interfered wireless link and the interfering wireless link and determining the coordinated schedulable resources based on the updated link pair information.

In a further embodiment, the determining the coordinated schedulable resources comprises using the link pair information as inputs of a graph coloring algorithm to determine orthogonal schedulable resources for the interfered wireless link and the interfering wireless link and generating the coordinated schedulable resource message including identifiers of the wireless links and the wireless networks, a number of colors that the graph coloring algorithm needs to get the wireless links orthogonalized from each other and identifiers of the colors.

In an additional embodiment, the performing the coordination comprises transmitting respectively to the at least one wireless network and the second wireless network a coordinated resource release message to release the coordinated resources when the interference falls below the pre-determined threshold or the interference has not occurred for a pre-determined period of time.

According to another aspect of the disclosure, there is provided a method for use in a wireless network for coordinating resource scheduling between two or more wireless networks which operate on same or overlapping radio resources, wherein each wireless network comprises one or more radio access nodes and one or more terminal devices connected thereto. The method comprises transmitting a resource coordination request message to a central coordination node, wherein the resource coordination request message includes identifiers of at least one pair of wireless links which include an interfered wireless link in the wireless network and an interfering wireless link in a second wireless network. The method also comprises receiving, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message. The method further comprises scheduling the interfered wireless link according to the coordinated schedulable resource message.

In an embodiment, the transmitting the resource coordination request message comprises transmitting the resource coordination request message when the interference caused by the interfering wireless link on the interfered wireless link exceeds a pre-determined threshold.

In another embodiment, the coordinated schedulable resource message indicates which radio resources are schedulable to at least one of the interfered wireless link and the interfering wireless link and wherein the radio resources schedulable to the interfered wireless link and the radio resources schedulable to the interfering wireless link are at least partially orthogonal to each other.

In yet another embodiment, the method further comprises updating previously-stored resource scheduling information based on the coordinated schedulable resource message.

In a further embodiment, the method further comprises transmitting to the central coordination node a resource release request message to release the coordinated schedulable resources when the interference falls below the pre-determined threshold or the interference has not occurred for a pre-determined period of time and scheduling the interfered wireless link according to a response to the resource release request message from the central coordination node.

According to an aspect of the present disclosure, there is provided a method for use in a wireless network for coordinating resource scheduling between two or more wireless networks which operate on same or overlapping radio resources, wherein each wireless network comprises one or more radio access nodes and one or more terminal devices connected thereto. The method comprises. The method also comprises receiving, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message. The method further comprises scheduling the interfering wireless link according to the coordinated schedulable resource message. In an embodiment, the interfering wireless network may also send to the central coordination node a resource coordination request message when one of its wireless links becomes an interfered wireless link and needs to be coordinated.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises a receiving unit configured to receive a resource coordination request message from at least one wireless network, wherein the resource coordination request message includes identifiers of at least one pair of wireless links include an interfered wireless link in the at least one wireless network and an interfering wireless link in a second wireless network. The apparatus also comprises a performing unit configured to perform coordination about schedulable resources for the interfered wireless link and the interfering wireless link based on the resource coordination request message. The apparatus further comprises a transmitting unit configured to transmit a coordinated schedulable resource message to the at least one wireless network and the second wireless network such that at least one of the interfered wireless link and the interfering wireless link is scheduled according to the coordinated schedulable resource message.

According to another aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises a transmitting unit configured to transmit a resource coordination request message to a central coordination node, wherein the resource coordination request message includes identifiers of at least one pair of wireless links which include an interfered wireless link in the wireless network and an interfering wireless link in a second wireless network. The apparatus also comprises a receiving unit configured to receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request messages. The apparatus further comprises a scheduling unit configured to schedule the interfered wireless link according to the coordinated schedulable resource message.

According to yet another aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises a receiving unit configured to receive, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message. The apparatus further comprises a scheduling unit configured to schedule the interfering wireless link according to the coordinated schedulable resource message. In an embodiment, the resource coordination request message includes identifiers of at least one pair of wireless links which include the interfering wireless link in a wireless network and the interfered wireless link in a second wireless network.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to receive a resource coordination request message from at least one wireless network, wherein the resource coordination request message includes identifiers of at least one pair of wireless links which include an interfered wireless link in the at least one wireless network and an interfering wireless link in a second wireless network. The at least one memory and the computer program code are also configured to, with the at least one processor, cause the apparatus at least to perform coordination about schedulable resources for the interfered wireless link and the interfering wireless link based on the resource coordination request message. The at least one memory and the computer program code are further configured to, with the at least one processor, cause the apparatus at least to transmit a coordinated schedulable resource message to the at least one wireless network and the second wireless network such that at least one of the interfered wireless link and the interfering wireless link is scheduled according to the coordinated schedulable resource message.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to transmit a resource coordination request message to a central coordination node, wherein the resource coordination request message includes identifiers of at least one pair of wireless links which include an interfered wireless link in the wireless network and an interfering wireless link in a second wireless network. The at least one memory and the computer program code are also configured to, with the at least one processor, cause the apparatus at least to receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message. The at least one memory and the computer program code are further configured to, with the at least one processor, cause the apparatus at least to schedule the interfered wireless link according to the coordinated schedulable resource message.

According to another aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to receive, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message. The at least one memory and the computer program code are further configured to, with the at least one processor, cause the apparatus at least to schedule the interfering wireless link according to the coordinated schedulable resource message. In an embodiment, the resource coordination request message includes identifiers of at least one pair of wireless links which include the interfering wireless link in a wireless network and the interfered wireless link in a second wireless network.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises processing means adapted to receive a resource coordination request message from at least one wireless network, wherein the resource coordination request message includes identifiers of at least one pair of wireless links which include an interfered wireless link in the at least one wireless network and an interfering wireless link in a second wireless network. The processing means is also adapted to perform coordination about schedulable resources for the interfered wireless link and the interfering wireless link based on the resource coordination request message. The processing means is further adapted to transmit a coordinated schedulable resource message to at least one of the at least one wireless network and the second wireless network such that at least one of the interfered wireless link and the interfering wireless link is scheduled according to the coordinated schedulable resource message.

According to another aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises processing means adapted to transmit a resource coordination request message to a central coordination node, wherein the resource coordination request message includes identifiers of at least one pair of wireless links which include an interfered wireless link in the wireless network and an interfering wireless link in a second wireless network. The processing means is also adapted to receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message. The processing means is further adapted to schedule the interfered wireless link according to the coordinated schedulable resource message.

According to another aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises processing means adapted to receive, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message. The processing means is further adapted to schedule the interfering wireless link according to the coordinated schedulable resource message. In an embodiment, the resource coordination request message includes identifiers of at least one pair of wireless links which include the interfering wireless link in a wireless network and an interfered wireless link in a second wireless network.

By means of solutions discussed in the various aspects and embodiments as mentioned above, the interference taking place between wireless networks can be avoided or at least reduced by coordinating resource scheduling. Further, by performance of coordination among two or more wireless networks, radio resources can be effectively and dynamically scheduled and used, thereby improving spectrum efficiency. Further, by using the resource coordination message, the sensitive information, such as valuation of radio resources, may not need to be disclosed or shared between different operators, thereby giving network security a big boost.

BRIEF DESCRIPTION OF THE DRAWINGS

Embodiments will now be described in more detail in relation to the enclosed drawings, in which:

FIG. 6A is a schematic diagram illustrating an example topology with multiple interfering UDNs according to an embodiment of the present disclosure, FIG. 6B is a schematic diagram illustrating an example of an interference graph according to an embodiment of the present disclosure, FIG. 6C is a schematic diagram illustrating an example of a colouring solution according to an embodiment of the present disclosure.

DETAILED DESCRIPTION

Figure 1:
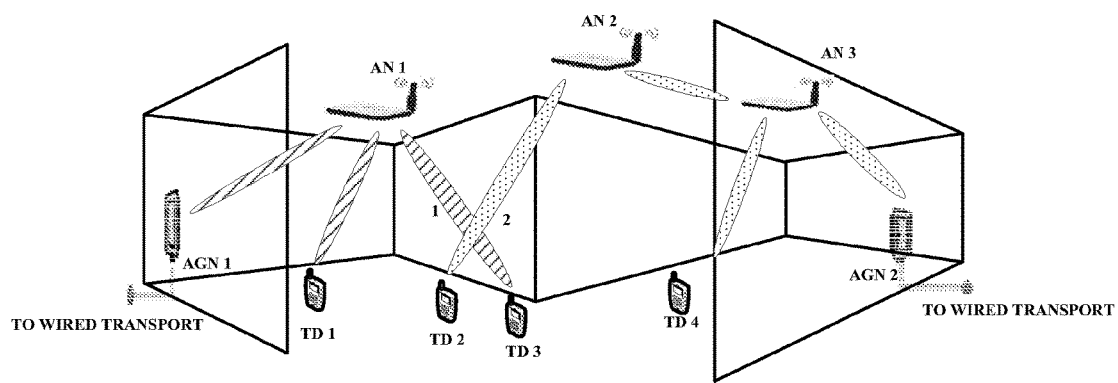
FIG. 1 is a schematic overview diagram depicting a scenario for inter-UDN co-channel spectrum sharing.

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the terminal device ("TD") may be any suitable wireless communication terminal or user equipment ("UE"), such as a mobile phone or a portable computer, which is capable of operating in the UDN. Likewise, the radio access node may be any suitable wireless communication intermediary devices, such as a wireless relay node, a wireless router, a wireless access point, a base station or base site, which is capable of connecting the terminal device to another wireless access node or connecting the terminal device to the core network.

The interference, as discussed throughout the present description, may relate to acceptable interference and unacceptable interference, wherein the acceptable interference is caused by an interference signal (e.g., from an interfering UDN) to the wireless link in the interfered UDN and does not degrade the current selection of modulation and coding scheme ("MCS") at a receiver. As compared thereto, the unacceptable interference would degrade the MCS selection and needs to be avoided or at least reduced. The distinguishing of the acceptable interference and unacceptable interference may be accompanied by setting a pre-determined threshold (in dBm) in term of a signal level, below which an interference signal would cause acceptable interference and may be negligible and above which an interference signal would cause unacceptable interference on the wireless link and needs to be eliminated or at least reduced.

The wireless links that are affected by the interference may consist of a number of inter-network link pairs, each of which includes one wireless link in a first UDN that suffers from interference from another wireless link in a second UDN since the inter-network interference exceeds the predetermined threshold. For a simplified purpose, throughout the present description, the victim link in the above inter-network link pair is referred to as the interfered link and the aggressor link is referred to as the interfering link. Further, a wireless link, according to the embodiments of the present disclosure, is defined as a unidirectional transmission between two nodes, e.g., one transmitter node and one receiver node, belonging to the same network. Such a link may exist between a terminal device and a radio access node or between radio access nodes when the UDN applies wireless self-backhauling.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Figure 2:
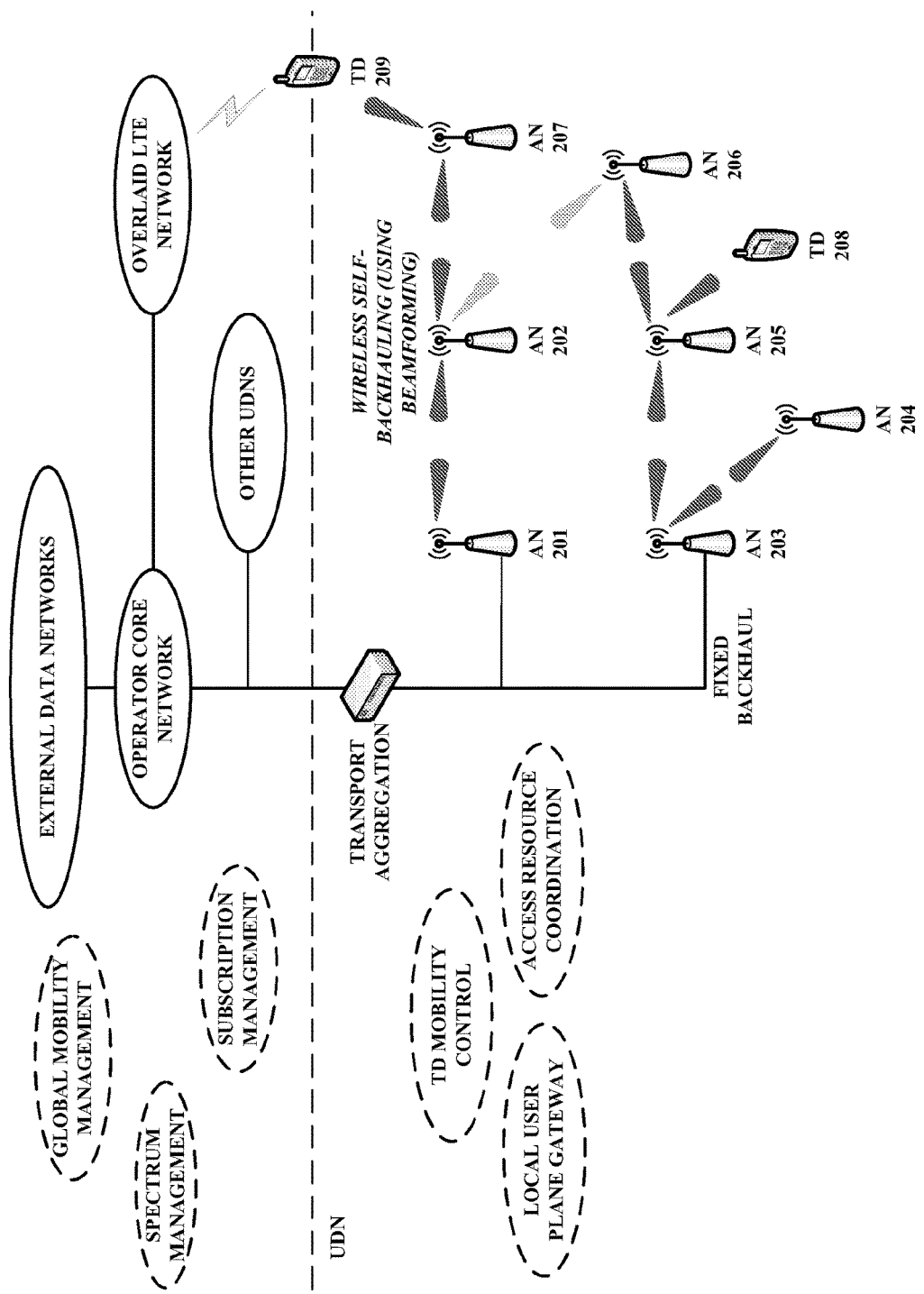
FIG. 2 is a schematic diagram depicting a UDN architecture in which embodiments of the present disclosure may be practiced.

FIG. 2 is a schematic diagram depicting a UDN architecture in which embodiments of the present disclosure may be practiced. As shown in FIG. 2, the UDN architecture, among other things, includes radio or wireless Access Nodes (ANs) and terminal devices (TDs), such as ANs 201-207 and TDs 208-209. Since UDNs are envisioned to provide ubiquitous mobile broadband with access-node densities considerably higher than the densest cellular networks of today, the distance between ANs is from a few meters in indoor deployments up to around 50 m in outdoor deployment. The ANs in the UDN may perform scheduling and baseband processing and terminate the radio interface (including physical, medium access, and link layers) towards the TDs. The ANs may also directly be connected to fixed transport backhaul or can be wirelessly backhauled by other ANs, e.g., the AN 201 being connected with the AN 203 via a fixed backhaul link and the AN 201 being connected with the AN 202 via a wireless link. The ANs may additionally connect to a transport aggregation node over which the ANs may communicate with the operator core network, external data network (for example, internet) or other UDNs provided by different operators. The ANs may be aided by several logical functional entities responsible for managing various aspects of the UDN, including access resource coordination, TD mobility control, and local user plane gateway functionality. These functional entities may in some scenarios be implemented in the ANs, local servers or even in the remote cloud. Similarly, there would be multiple logical functional entities responsible for global mobility management, spectrum management and subscription management at the core network side.

Figure 3:
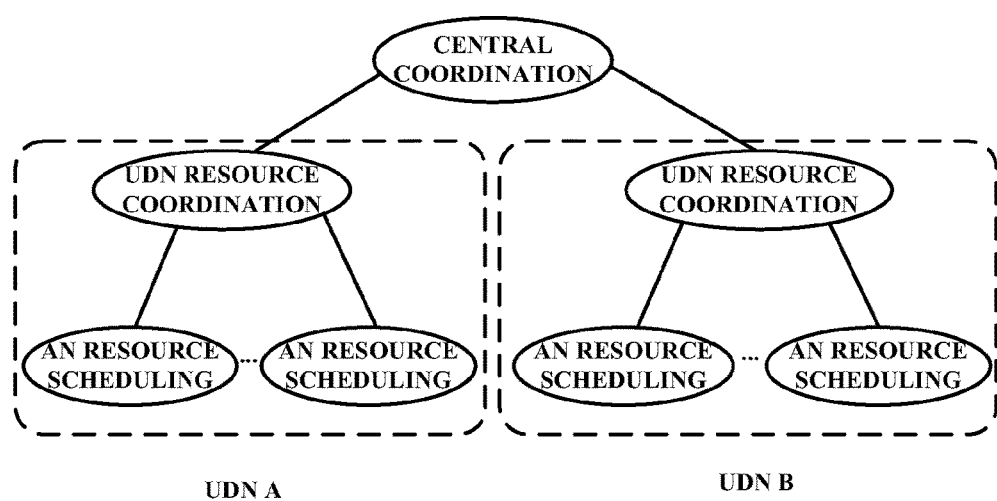
FIG. 3 is a schematic diagram illustrating logical centralized structure of UDNs according to an embodiment of the present disclosure.

FIG. 3 is a schematic diagram illustrating logical centred structure of UDNs. According to embodiments of the present disclosure, a 3-layer logical architecture is proposed to enable inter-UDN coordinated resource scheduling (e.g., for spectrum sharing), in which three kinds of functional entities are involved, i.e., a central coordination functionality ("CCF") entity, a UDN resource coordination functionality ("URCF") entity and an AN resource scheduling functionality ("ARSF") entity. The operational details of these functional entities are given as follows for an illustrative purpose:

Central Coordination Functionality ("CCF") entity: This entity is a centralized functional entity communicating with multiple UDNs (for example, UDNs A and B as shown) and is responsible for avoiding inter-UDN interference by imposing certain coordinated resource constraints on different UDNs through a coordinated schedulable resource message including a coordination context ("CC"), as will be discussed in detail with reference to FIG. 5. In short, the CCF entity would collect link-specific interference information and determine the CC (or schedulable resources) for each link to try to avoid inter-UDN interference exceeding a predetermined threshold.

UDN Resource Coordination Functionality ("URCF") entity: This entity is specific to the UDN and is responsible for coordinating resources between ANs belonging to the same UDN and also resources between ANs belonging to the different UDNs. The main function of the URCF entity for inter-UDN coordination will be discussed in detail later; and AN Resource Scheduling Functionality ("ARSF") entity: This entity is specific to the AN and is responsible for allocating resources to its all involved links including access and backhaul wireless links based on received constraints of allowed resources from the URCF entity.

The above only describes main functions that these functional entities may have and other specific functions will be discussed later where necessary, e.g., in connection with FIG. 9. Further, these logical functional entities may have different choices on the implemented physical nodes. For example, the URCF entity may be implemented in the ANs in some scenarios but could also be implemented in local servers. The CCF entity may be located in a transport aggregation node (e.g., one illustrated in FIG. 2) connecting with different UDNs simultaneously and optionally be implemented in local servers of one UDN, which has been selected as the header of one UDN cluster consisted of a plurality of UDNs.

Figure 4:
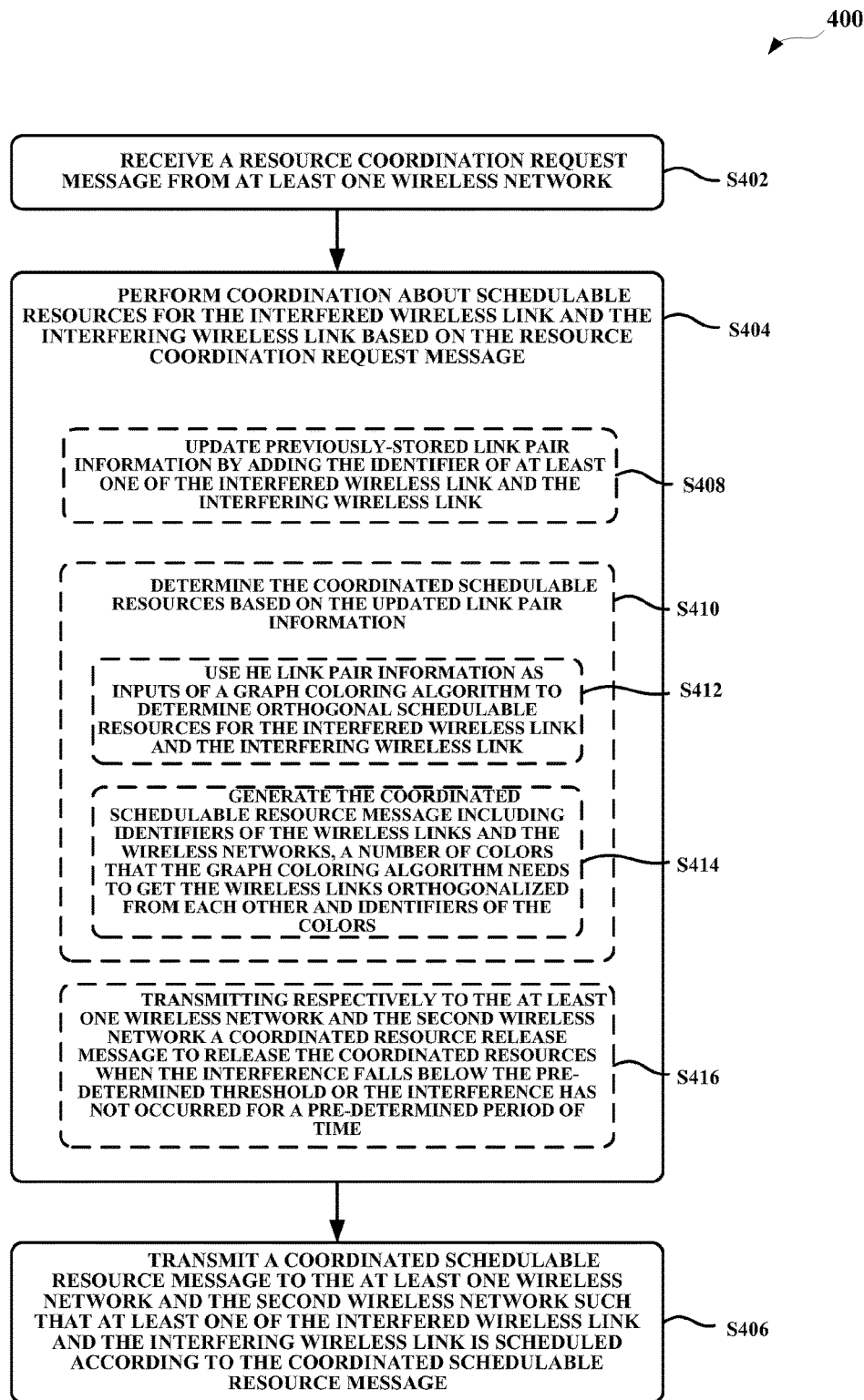
FIG. 4 is a schematic flowchart of a method for use in a wireless network for coordinating resource scheduling according to an embodiment of the present disclosure, FIG. 5 are principle diagrams illustrating examples of coordination contexts (CCs) according to embodiments of the present disclosure.

FIG. 4 is a schematic flowchart of a method 400 for use in a central coordination node (e.g., the CCF entity as discussed in connection with FIG. 3) for coordinating resource scheduling according to an embodiment of the present disclosure. Although not shown, it should be noted that the coordinating may take place between two or more wireless networks which operate on the same or overlapping radio resources, wherein each wireless network comprises one or more radio ANs and one or more TDs connected thereto, for example, as shown in FIG. 2.

As illustrated in FIG. 4, at step S402, the method 400 receives a resource coordination request message from at least one wireless network (e.g., UDN), wherein the resource coordination request message includes identifiers of at least one pair of wireless links which include an interfered wireless link in the at least one wireless network and an interfering wireless link in a second wireless network (e.g., another UDN). Although not illustrated, in one embodiment, the receiving herein may comprise receiving the resource coordination request when interference caused by the interfering wireless link on the interfered wireless link exceeds a pre-determined threshold.

Then, at step S404, the method 400 performs coordination about schedulable resources for the interfered wireless link and the interfering wireless link based on the resource coordination request message. After that, at step S406, the method 400 transmits a coordinated schedulable resource message to the at least one wireless network and the second wireless network such that at least one of the interfered wireless link and the interfering wireless link is scheduled according to the coordinated schedulable resource message. In other words, the coordinated schedulable resource message may be flexibly or selectively sent to either or both of the wireless networks and therefore, depending on different implementations, at least one of the interfering and interfered wireless links could be scheduled according to the coordinated schedulable resource message. For example, the interfered wireless link would be scheduled according to the coordinated schedulable resource message but the interfering wireless link may neglect the message and be scheduled as before and vice versa. As another example, the interfered and interfering wireless links would both be scheduled by following the coordinated schedulable resources.

Although not shown, in an embodiment, the resource coordination message herein may indicate which radio resources are schedulable to at least one of the interfered wireless link and the interfering wireless link and wherein the radio resources schedulable to the interfered wireless link and the radio resources schedulable to the interfering wireless link are at least partially orthogonal to each other. Further, the resource coordination message may comprise a bit sequence in which each bit is indicative of whether a radio resource in at least one of a time domain, a frequency domain, a power domain, and a code domain is schedulable to the at least one interfered wireless link or schedulable to the at least one interfering wireless link, as will be discussed in detail in reference to FIG. 5.

As illustrated in the block of the step S404, in performing the coordination about the schedulable resources, the method 400 may take several steps to do so. For example, the method 400 may update, at step S408, previously-stored link pair information by adding the identifier of at least one of the interfered wireless link and the interfering wireless link. Then, at step S410, the method 400 may determine the coordinated schedulable resources based on the updated link pair information. According to some embodiments, with respect to the determining at step S410, the method 400 may comprise using, at step S412, the link pair information as inputs of a graph coloring algorithm, which will be discussed in detail in reference to FIGS. 6A, 6B and 6C, to determine orthogonal schedulable resources for the interfered wireless link and the interfering wireless link and at step S414, generating the coordinated schedulable resource message including identifiers of the wireless links and the wireless networks, a number of colors that the graph coloring algorithm needs to get the wireless links orthogonalized from each other and identifiers of the colors. Additionally, the performing, at step S404, may comprise transmitting, at step S416, respectively to the at least one wireless network and the second wireless network a coordinated resource release message to release the coordinated resources when the interference falls below the pre-determined threshold or the interference has not occurred for a pre-determined period of time.

By virtue of the method 400 as performed in the central coordination node and its several variants or improvements as set forth in the above embodiments, the interference, particularly the unacceptable interference as discussed before, between two wireless links could be avoided or at least diminished, depending on, e.g., the number of the schedulable resources. Meanwhile, by the resource coordinating, the radio resource could be flexibly and efficiently applied and therefore spectrum efficiency may be notably improved.

Figure 5:
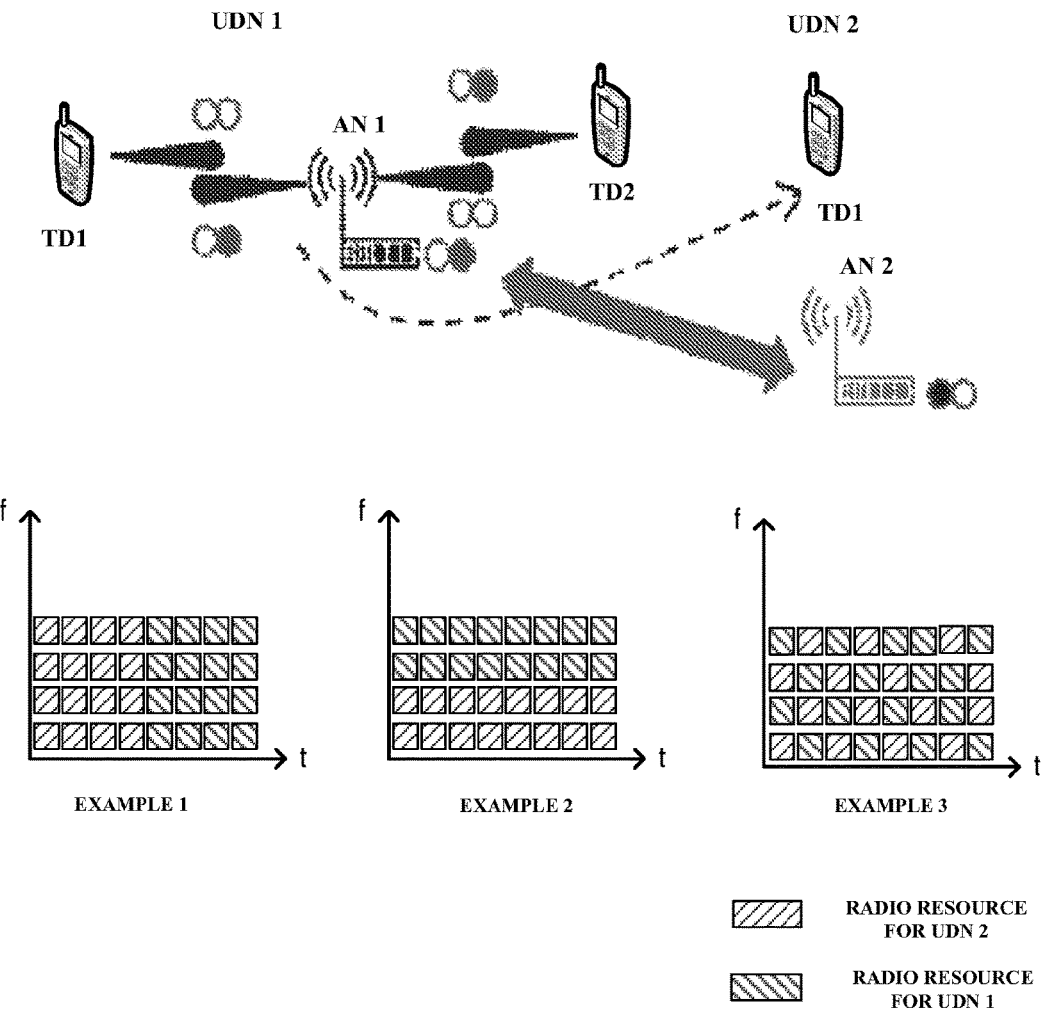

For a better understanding of the resource coordination message as mentioned above, the following will discuss a coordination context ("CC"), which may be carried by, as a part of, or act as the coordinated schedulable resource message, with reference to FIG. 5, which shows principle diagrams illustrating examples of CCs according to embodiments of the present disclosure.

According to the embodiments of the present disclosure, if interference between two wireless links A and B (i.e., interfering and interfered wireless links), where the wireless link A belongs to a UDN 1 and the wireless link B belongs to a UDN 2, exceeds a pre-determined threshold, coordination of radio resource usage would take place through assigning a CC to the wireless link A in the UDN 1 and the wireless link B in the UDN 2. For example, as illustrated in FIG. 5, when the TD 1 moves from the coverage area of the UDN 1 into the coverage area of the UDN 2, due to having been subscribed to different operators, the TD 1 would still have to access to the AN 1 rather than AN 2; therefore, the uplink between the TD 1 and AN 1 would interfere with the uplink between the TD 2 and the AN 2. When this interference exceeds the pre-determined threshold, a coordination procedure would be initiated by the URCF entity transmitting the resource coordination request message to the CCF entity and thereafter a CC may be developed and coordinated by the CCF entity to determine the schedulable resources for both links, which could be defined as a particular transmission direction (uplink or downlink) between a TD and an AN as shown in FIGS. 2 and 5. Through the coordination, transmission of a pair of links (one interfered link in a UDN and one interfering link in another UDN) may be subject to scheduling constraints such that both wireless links cannot be scheduled on the same radio resources.

As an example, a CC may be a data structure that indicates on which radio resources the UDN 1 may schedule transmissions of the wireless link A and on which radio resources the UDN 2 may schedule transmissions of the wireless link B, wherein A and B here may be the respective identifiers of two wireless links, and these two subsets of schedulable radio resources are at least partly orthogonal to each other such that the interference arises between the two wireless links could be avoided or reduced at least.

According to an embodiment of the present disclosure, a set of available radio resources may consist of a two-dimensional array, wherein the horizontal dimension represents a time dimension (in time slots) and the vertical dimension represents frequency subchannels (in subcarriers or resource blocks), as three examples shown in FIG. 5. In this manner, a CC would be an array of binary numbers or a bit sequence, one radio resource per bit, which indicates whether the corresponding wireless link may be scheduled on the corresponding radio resource or not.

For instance, a CC for the uplink transmission of the TD1 may include a bit sequence of "11110000," which expresses that the first four radio resources are schedulable to TD1 and second four radio resources are not schedulable to TD1. As for the uplink transmission of the TD 2, through the coordination as discussed in the method 400, a counter-CC may be formed which may include a bit sequence of "00001111" and express that the first four radio resources are not schedulable to the TD2 and the second four radio resources are schedulable to the TD2. That is, the first 50% of the resources are assigned to the interfering wireless link and the other 50% of the resources are assigned to the interfered wireless link. After that, the transmissions respectively associated with the interfering wireless link and the interfered wireless link would be scheduled to use these assigned resources.

Although there may be multiple options to express the content of the CC, how to determine the CC, i.e., the mutual orthogonal radio resources for a specific link pair is a task that needs to be addressed first. To this end, the following will provide an exemplifying embodiment to determine the orthogonal radio resources for specific links based on a graph coloring algorithm with reference to an example network topology as illustrated in FIG. 6A.

First, for a better understanding of the present disclosure, a brief introduction is made to the graph coloring algorithm. Without loss of generality, a coloring of a graph in the graph coloring algorithm is almost a proper vertex coloring inspired from map coloring, namely, a labeling of the graph's vertices with colors such that certain criteria are met, e.g., no two vertices sharing the same edge have the same color. For example, labels like red and blue are generally used when the number of colors is small, and normally it is understood that the labels are drawn from the integers {1, 2, 3 ... }. A coloring using at most k colors is called a (proper) k-coloring. The smallest number of colors needed to color a graph G is called its chromatic number.

Although it is known that the graph coloring problem is non-deterministic polynomial (NP)—complete and no polynomial time algorithm is known to solve it thus far, there are some heuristic algorithms to solve this problem, for example, a Larger First ("LF") algorithm, a Degree of Saturation (DSATUR) algorithm, and a Backtracking Sequential Coloring (BSC) algorithm.

Turning attentions to FIG. 6A, there are three UDNs in the example network topology and each UDN has its own coverage area depicted as bigger circles. Within these UDNs are a plurality of wireless links, such as wireless links A1-A5, B1-B6 and C1-C4, each of which is depicted as a solid line connecting two little circles, each representing a node (TD or AN). For a better illustration, the interference between multiple link pairs is depicted through dashed lines. Hence, it is assumed that interference takes place between the links A5 and C2, between the links C2 and B4, between the links B4 and A1, between the links A1 and C3, between the links C3 and B3, and between the links A1 and B2, wherein one link of each link pair belongs to one UDN and the other link thereof belongs to the other UDN, for example, the link A5 may be from UDN A and the peer link C2 may be from UDN C, as illustrated by little circles filled with distinguishing patterns.

Under the network architecture such as shown by FIG. 6A, a graph used in the graph coloring algorithm consists of a set of nodes and a set of edges connecting the nodes that have a particular relation. Therefore, the link pairwise interference in the present disclosure may be represented as a graph G=(V, E), in which set V represents the links (such as those shown as solid lines in FIG. 6A) and edge set E represents the pairwise interference (such as those shown as dashed lines in FIG. 6A). By collecting interference information, such as identifiers of the interfered and interfering wireless links, the link pairs (A1→B2), (A1←B4), (A1→C3), (A5→C2), (B4→C2), (B3←C3), as non-limiting examples, may be used as inputs of the graph coloring algorithm, wherein the end of each arrow points to the interfered wireless link. Thereby, an interference graph, such as one illustrated in FIG. 6B, may be drawn by considering links and the interference relationship as vertexes and edges respectively.

As noted previously, in order to avoid the severe interference between different UDNs, the interference link pair (e.g., A1→B2) should be scheduled on different radio resources. In other words, the allocated CCs for both wireless links should be orthogonal. If different colors are used to represent orthogonal resources, then the former CC allocation problem turns out to be the following graph coloring problem:

Graph coloring problem: Given a graph G (V,E), finding a minimum k, and a mapping r: V {1, . . . , k} such that r(i)≠r(j) for each edge (i, j)∈E.

The above problem is a NP-hard problem with some mature mathematical solutions such as iterative greedy algorithm and an answer to this problem is the minimum number of colors needed (also referred to as "color rank" for simplicity) and color mapping results (also referred to as CC mapping results). For example, FIG. 6C illustrates one coloring solution for the graph as illustrated in FIG. 6B, wherein two colors, e.g., yellow and purple, which are represented using two different filled patterns for a better showing when printed in black and white, are needed to distinguish all seven link pairs shown with ellipses, meaning that the color rank in this example is two.

Figure 6D:
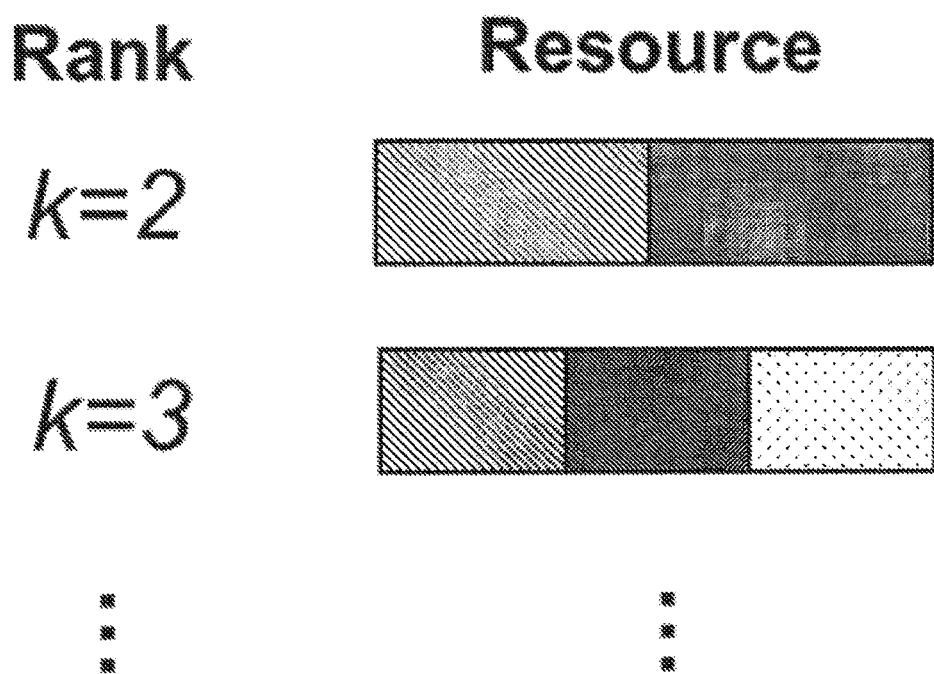
FIG. 6D is a schematic diagram illustrating a division of a resource pool into k orthogonal parts according to an embodiment of the present disclosure.

For each possible color rank k, the resource pool should be divided into k orthogonal parts for CC translation maps or rules as shown in FIG. 6D.

In FIG. 6D, different filled patterns represent different colors as above-mentioned. It should be noted that the CC translation map or rule information should be broadcasted to all related ARSF entities.

In this manner, the CC mapping results corresponding to the color rank 2 may be provided in the following table, wherein the REG is abbreviated for Resource Element Group.

| Link Pair | CC for first Link | CC for latter link |
| --- | --- | --- |
| A1 -> B2 | REG-yellow-rank2 | REG-purple-rank2 |
| A1 <- B4 | REG-yellow-rank2 | REG-purple-rank2 |
| A1 -> C3 | REG-yellow-rank2 | REG-purple-rank2 |
| A5 -> C2 | REG-purple-rank2 | REG-yellow-rank2 |
| B4 -> C2 | REG-purple-rank2 | REG-yellow-rank2 |
| B3 <- C3 | REG-yellow-rank2 | REG-purple-rank2 |

The information as listed in the above table may be stored in a CC database, which may also be referred to as an interference information database, for lookup, retrieve and update.

Figure 7:
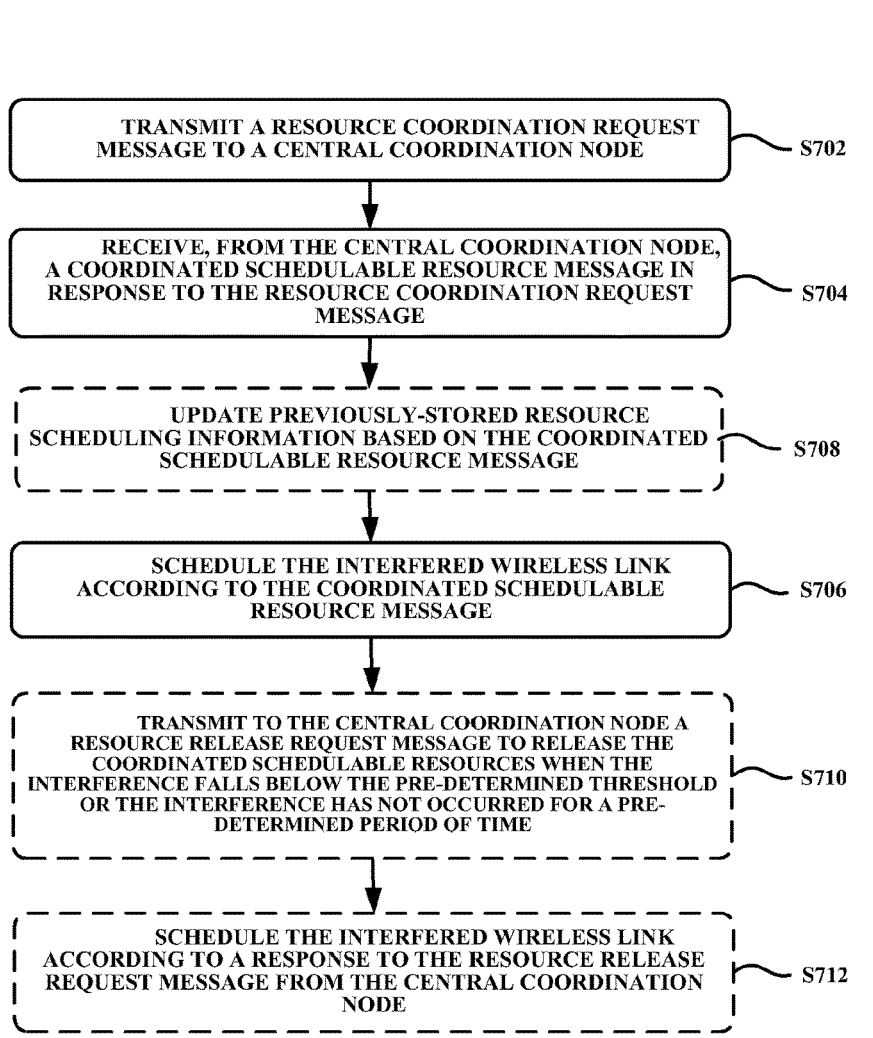
FIG. 7 is a schematic flowchart of a method for use in a wireless network for coordinating resource scheduling according to an embodiment of the present disclosure.

FIG. 7 is a schematic flowchart of a method 700 for use in a wireless network for coordinating resource scheduling according to another embodiment of the present disclosure. Similar to the method 400, it should be noted that the coordinating may take place between two or more wireless networks which operate on the same or overlapping radio resources, wherein each wireless network comprises one or more radio ANs and one or more TDs connected thereto, for example, as shown in FIG. 2.

As illustrated in FIG. 7, the method 700, at step S702, transmits a resource coordination request message to a central coordination node (e.g., a CCF entity), wherein the resource coordination request message includes identifiers of at least one pair of wireless links which include an interfered wireless link in the wireless network and an interfering wireless link in a second wireless network. In one embodiment, the transmission of the resource coordination request message is triggered when the interference caused by the interfering wireless link on the interfered wireless link exceeds a pre-determined threshold.

Then, at step S704, the method 700 receives, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message. The coordinated schedulable resource message herein may have the same meaning and implementations as those discussed in the method 400 and thus further details thereof are omitted herein for a concise purpose.

After receiving the coordinated schedulable resource message, the flow advances to step S706, at which the method 700 schedules the interfered wireless link according to the coordinated schedulable resource message.

In one embodiment, the method 700 may further comprise updating, at step S708, the previously-stored resource scheduling information based on the coordinated schedulable resource message. The previously-stored resource scheduling information herein may include but not be limited to the CC translation information and CC mapping results as set forth before. In another embodiment, the method 700 may further comprise transmitting, at step S710, to the central coordination node a resource release request message to release the coordinated schedulable resources when the interference falls below the pre-determined threshold or the interference has not occurred for a pre-determined period of time and then, at step S712, scheduling the interfered wireless link according to a response to the resource release request message from the central coordination node.

By means of the method 700 and its variants and extensions as described in the above embodiments, efficient and effective radio resource (e.g., spectrum) sharing between multiple UDNs may be realized together with interference cancellation or reduction. Further, due to the centralized architecture, the global interference information, especially in the worst interference case, could be collected and considered, which leads to better and more accurate coordination results and thereby significantly improves the resource utility efficiency.

Figure 8:
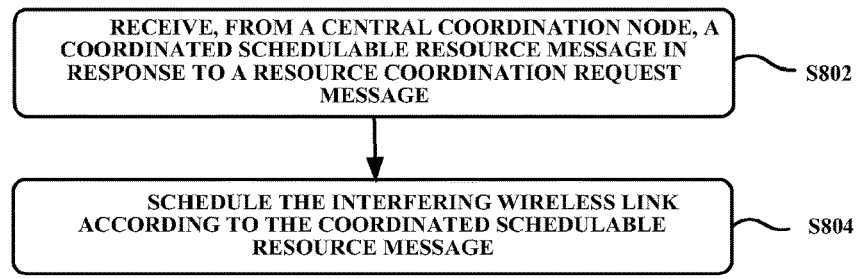
FIG. 8 is a schematic flowchart of a method for use in a wireless network for coordinating resource scheduling according to another embodiment of the present disclosure.

FIG. 8 is a schematic flowchart of a method 800 for use in a wireless network for coordinating resource scheduling according to another embodiment of the present disclosure. As illustrated in FIG. 8, the method 800, at step S802, receives from a central coordination node (e.g., a CCF entity), a coordinated schedulable resource message in response to a resource coordination request message, wherein the coordinated schedulable resource message is received from the central coordination node performing coordination about schedulable resources for an interfered wireless link and an interfering wireless link based on the resource coordination request message. After that, the method 800, at step S804, schedules the interfering wireless link according to the coordinated schedulable resource message. Although not illustrated, in one embodiment, the resource coordination request message includes identifiers of at least one pair of wireless links which include the interfering wireless link in a wireless network and the interfered wireless link in a second wireless network and is sent by the interfered wireless network to the central coordination node for coordinating resource scheduling.

It is to be understood that the method 800 is similar to the method 700 except that the method 800 is performed at the interfering wireless network. Therefore, the operations such as those performed by the method 700 at steps S708, S710 and S712 may also equally be applicable to the method 800.

Figure 9:
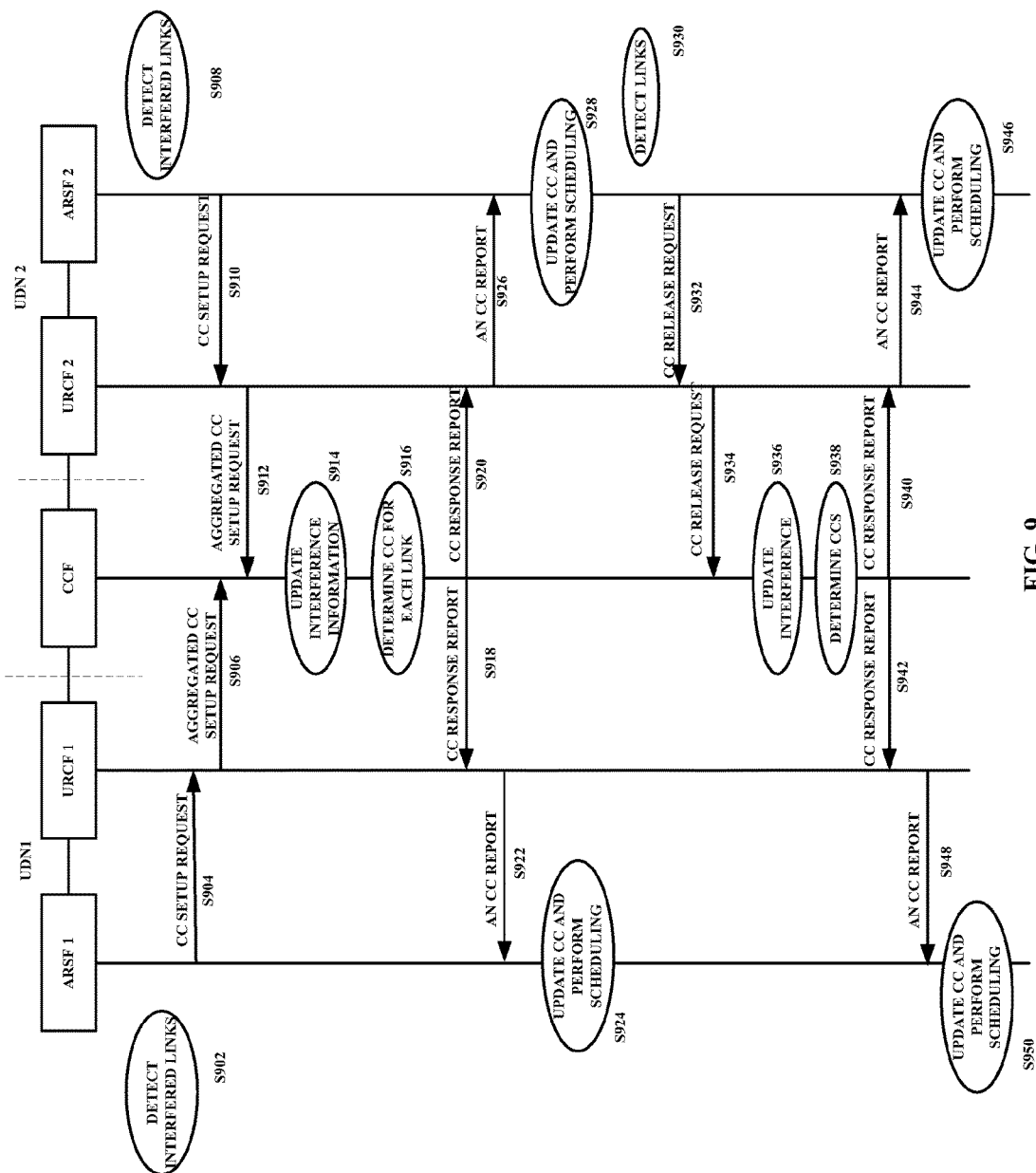
FIG. 9 is a messaging diagram exemplarily illustrating an inter-UDN coordination procedure according to embodiments of the present disclosure.

FIG. 9 is a messaging diagram exemplarily illustrating an inter-UDN coordination procedure according to embodiments of the present disclosure. For a purpose of simplifying descriptions, only two UDN, i.e., UDN 1 and UDN 2, each includes a respective ARSF entity and URCF entity, are illustrated and coordinated through the CCF entity (i.e., the central coordination node) such that radio resource sharing could be achieved together with interference cancellation or reduction.

The inter-UDN coordination procedure starts at step S902 or concurrently at S908, where each node (TD or AN) in every UDN (here, UDN 1 and UDN 2) performs inter-UDN interference measurement periodically or triggered by certain events (e.g., measured SINR below a pre-determined threshold) so as to detect the interfered links. When the measured interference exceeds a predetermined threshold, an ARSF entity included in this node will send a CC setup request (i.e., resource coordination request message) including the interfered link identifier and the interfering link identifier to the URCF entity, such as the URCF entity 1 in the UDN 1 at step S904 and the URCF entity 2 at step S910.

Since one URCF entity may control and manage a plurality of ARSF entities as shown in FIG. 3, the URCF entities 1 and 2 may aggregate a plurality of CC setup requests from respectively the plurality of ARSF entities and send the aggregated CC setup requests to the CCF entity at step S906 and similarly at step S912. Upon receipt of the aggregated CC setup requests, the CCF entity, at step S914, updates previously-stored link pair information in an interference information database ("DB") by e.g., adding the identifier of at least one of the interfered wireless link and the interfering wireless link. Then at step S916, the CCF entity determines a respective CC (e.g., constraints for the schedulable radio resources) for each CC setup request based on the collected global link-specific interference information. The CC herein may take the form as discussed with reference to FIG. 5 and may be determined by the graph coloring algorithm.

Upon determining the CCs for the interfered and interfering wireless links, at steps S918 and S920, the CCF entity sends the CC response reports (i.e., coordinated schedulable resource messages) to the URCF 1 and URCF 2, respectively. In one embodiment, the CC response report may include but not be limit to the identifiers of the related UDNs and wireless links, the color rank and the identifiers of the CC colors when the graph coloring algorithm is applied for CC determination.

Then, within the respective UDN 1 and 2, at steps S922 and S926, the URCF 1 and URCF 2 send to the respective ARSF 1 and ARSF 2 AN CC reports which, among other things, include the information as conveyed by the CC response report. As an alternative, the URCF entity may directly forward the CC response report to the ARSF entity. After receiving the AN CC report, the ARSF 1 may update the CC stored in a local CC database and schedule the interfered wireless link based thereon at step S924, i.e., the wireless links with the CC would only be scheduled in the radio resource part indicated by the CC and wireless links without the CC may be scheduled more freely without any constraints from the CC. The same may arise within the UDN 2 at step S928, that is, the interfering wireless link would also be scheduled according to resource constraints imposed by the CC.

The foregoing has discussed how to implement the inter-UDN radio resource coordination and thereby efficiently reduce the interference. The following will discuss operations regarding how to release at least some of the radio resources as coordinated.

After scheduled on the coordinated schedulable resources, the node in the UDN may also track the interference status of each wireless link with the CC. For example, the node in the UDN 2 needs to detect whether the wireless link with the CC is still severely interfered by other wireless links at step S930. The detection here may be performed by checking whether the measured interference falls below the pre-determined threshold or when the interference has not occurred for a pre-determined period of time. If either of the conditions is met, then at step S932, a CC release report (i.e., the coordinated resource release message) is issued to the URCF entity 2 from the ARSF entity 2. Then, at step S934, the URCF entity 2 forwards the received CC release report to the CCF entity. Then, at step S936, the CCF entity may update the interference information DB by deleting the CC generated for the related interfered and interfering wireless links. Alternatively or additionally, at step S938, the CCF may determine new CCs for some of interfering and interfered wireless links as appropriate due to the former update.

After that, steps S942, S940, S948, S950, S944 and S946, which are respectively similar to the steps S918, S920, S922, S924, S926 and S928, are performed and finally the ARSF entity 1 and ARSF entity 2 may schedule the wireless links with the updated CCs.

From the above discussion made with reference to FIG. 9, it is to be understood that the CCF entity according to the embodiments of the present disclosure may be responsible for:
- maintaining the interference graph by receiving the CC setup or release request from the URCF entity of connected UDNs and solving graph coloring problem to obtain the minimum number of colors needed and link to CC mapping results, e.g., shown in the table before if the graph coloring algorithm is applied;
- broadcasting CC response reports including CC translation maps to the ARSF entity of different UDNs via respective URCF entities; and
- sending the CC report of the updated wireless links to the corresponding ARSF entity via the URCF entity which is responsible for scheduling the related wireless links.

Correspondingly, the URCF entity according to the embodiments of the present disclosure may be responsible for:
- collecting CC setup or release requests and then sending them to the CCF entity; and
- receiving CC response report information and distributing them to the corresponding ARSF entity based on some routing paths.

The ARSF entity according to the embodiments of the present disclosure may be responsible for:
- receiving the AN CC reports including the CC translation rules broadcasted by the CCF entity; and
- scheduling the wireless links on allowed or schedulable radio resources translated from the AN CC reports based on the CC translation rules.

Figure 10:
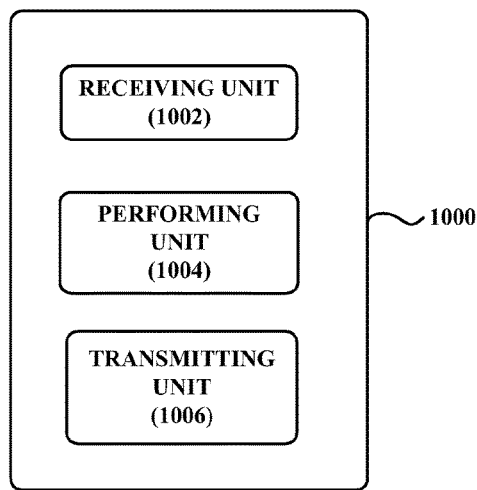
FIG. 10 is a schematic block diagram depicting an apparatus for coordinating resource scheduling according to an embodiment of the present disclosure.

FIG. 10 is a schematic block diagram depicting an apparatus 1000 for coordinating resource scheduling according to an embodiment of the present disclosure. As illustrated in FIG. 10, the apparatus 1000 comprises a receiving unit 1002 configured to receive a resource coordination request message from at least one wireless network, wherein the resource coordination request message includes identifiers of at least one pair of wireless links include an interfered wireless link in the at least one wireless network and an interfering wireless link in a second wireless network. The apparatus 1000 also comprises a performing unit 1004 configured to perform coordination about schedulable resources for the interfered wireless link and the interfering wireless link based on the resource coordination request message. The apparatus 1000 further comprises a transmitting unit 1006 configured to transmit a coordinated schedulable resource message to the at least one wireless network and the second wireless network such that at least one of the interfered wireless link and the interfering wireless link is scheduled according to the coordinated schedulable resource message.

Although not illustrated, in one embodiment, the performing unit 1004 is further configured to update previously-stored link pair information by adding the identifier of at least one of the interfered wireless link and the interfering wireless link and further configured to determine the coordinated schedulable resources based on the updated link pair information.

Figure 11:
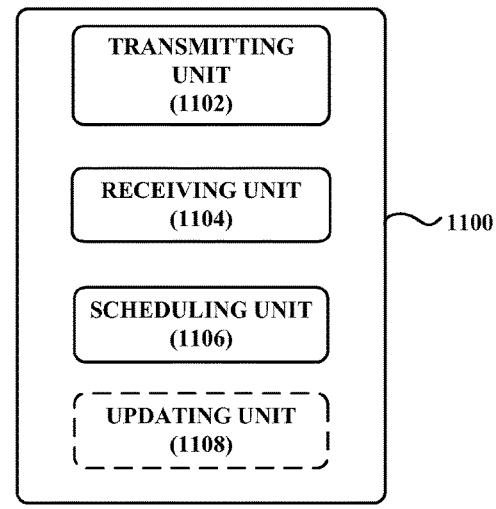
FIG. 11 is a schematic block diagram depicting an apparatus for coordinating resource scheduling according to another embodiment of the present disclosure.

FIG. 11 is a schematic block diagram depicting an apparatus 1100 for use in a wireless network for coordinating resource scheduling according to another embodiment of the present disclosure. As illustrated in FIG. 11, the apparatus 1100 comprises a transmitting unit 1102 configured to transmit a resource coordination request message to a central coordination node, wherein the resource coordination request message includes identifiers of at least one pair of wireless links which include an interfered wireless link in the wireless network and an interfering wireless link in a second wireless network. The apparatus 1100 also comprises a receiving unit 1104 configured to receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message. The apparatus 1100 further comprises a scheduling unit 1106 configured to schedule the interfered wireless link according to the coordinated schedulable resource message.

Although not illustrated, in one embodiment, the transmitting unit 1102 is further configured to transmit the resource coordination request message when interference caused by the interfering wireless link to the interfered wireless link exceeds a pre-determined threshold, e.g., through detection operations as mentioned before.

In another embodiment, the apparatus 1100 may further comprise an updating unit 1108 configured to update previously-stored resource scheduling information based on the coordinated schedulable resource message.

In one embodiment, the transmitting unit 1102 is further configured to transmit to the central coordination node a resource release request message to release the coordinated resources when the interference falls below the pre-determined threshold or the interference has not occurred for a pre-determined period of time, and the scheduling unit 1106 is further configured to schedule the interfered wireless link according to a response to the resource release request message from the central coordination node.

It should be noted that the apparatus 1100 may also be within the interfering wireless network and therefore the scheduling unit 1106 thereof may also be configured to schedule the interfering wireless link according to the coordinated schedulable resource message.

Figure 12:
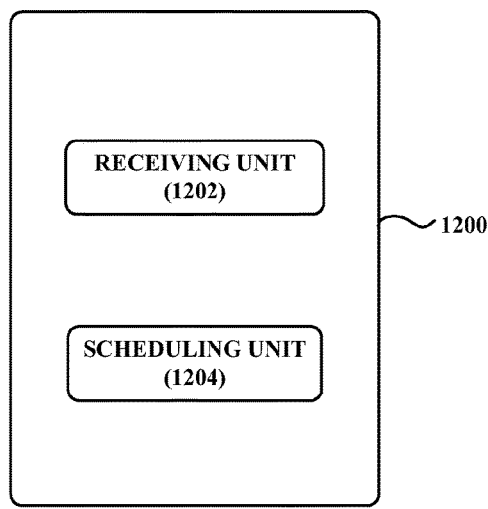
FIG. 12 is a schematic block diagram depicting an apparatus for coordinating resource scheduling according to an embodiment of the present disclosure.

FIG. 12 is a schematic block diagram depicting an apparatus 1200 for use in a wireless network for coordinating resource scheduling according to another embodiment of the present disclosure. As illustrated in FIG. 12, the apparatus 1200 comprises a receiving unit 1202 configured to receive, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message. The apparatus 1200 also comprises a scheduling unit 1204 configured to schedule the interfering wireless link according to the coordinated schedulable resource message. Although not illustrated, in one embodiment, the resource coordination request message herein may include identifiers of at least one pair of wireless links which include the interfering wireless link in a wireless network and the interfered wireless link in a second wireless network and be sent by the interfered wireless network to the central coordination node for coordinating resource scheduling.

It is to be understood that the apparatuses 1000, 1100 and 1200 are capable of performing the methods 400, 700, and 800, respectively and also capable of performing the steps as illustrated in FIG. 9 in a centralized manner such that schedulable radio resources could be determined.

Figure 13:
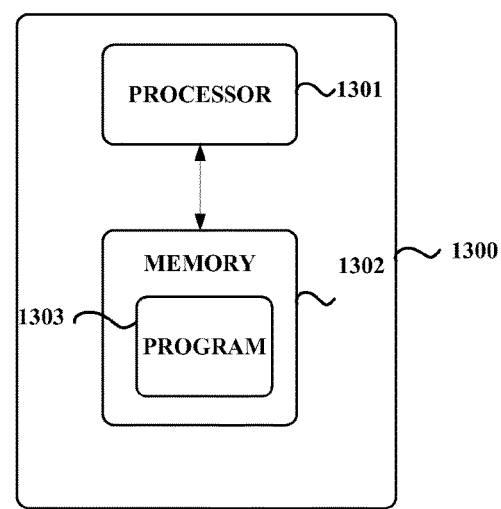
FIG. 13 is a schematic block diagram depicting an apparatus for coordinating resource scheduling according to embodiments of the present disclosure.

FIG. 13 is a schematic block diagram depicting an apparatus 1300 for coordinating resource scheduling according to embodiments of the present disclosure. As illustrated in FIG. 13, the apparatus 1300 includes at least one processor 1301, such as a data processor, at least one memory (MEM) 1302 coupled to the processor 1301. Depending on different implementations, although not shown, the apparatus 1300 may further include a suitable RF transmitter TX and receiver RX coupled to the processor 1301 so as to establish wireless connections with other nodes in the UDN. The MEM 1302 stores a program (PROG) 1304. A combination of the processor 1301 and the memory 1302 forms processing means adapted to perform the embodiments of the present disclosure. The apparatus 1300 may be coupled via a data path to one or more external networks or systems, such as the internet, for example.

The PROG 1303 is assumed to include instructions that, when executed by the processor 1301, enable the apparatus 1300 to operate in accordance with the exemplary embodiments of the present disclosure, as discussed herein with the methods 400, 700 and 800 and depicted in FIG. 9.

In general, the embodiments of the present disclosure may be implemented by computer software executable by at least one processor 1301 of the apparatus 1300, or by hardware, or by a combination of software and hardware.

The MEM 1302 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 1300, there may be several physically distinct memory units in the apparatus 1300. The processor 1301 may be of any type suitable to the local technical environment, and may include one or more of general purpose computers, special purpose computers, microprocessors, digital signal processors (DSPs) and processors based on multicore processor architecture, as non limiting examples. The apparatus 1300 may have multiple processors, such as for example an application specific integrated circuit chip that is slaved in time to a clock which synchronizes the main processor.

According to the above descriptions, the present disclosure proposes an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to receive a resource coordination request message from at least one wireless network, wherein the resource coordination request message includes identifiers of at least one pair of wireless links which include an interfered wireless link in the at least one wireless network and an interfering wireless link in a second wireless network; perform coordination about schedulable resources for the interfered wireless link and the interfering wireless link based on the resource coordination request message; transmit a coordinated schedulable resource message to the at least one wireless network and the second wireless network such that at least one of the interfered wireless link and the interfering wireless link is scheduled according to the coordinated schedulable resource message.

The present disclosure also proposes an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to: transmit a resource coordination request message to a central coordination node, wherein the resource coordination request message includes identifiers of at least one pair of wireless links which include an interfered wireless link in the wireless network and an interfering wireless link in a second wireless network; receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message; and schedule the interfered wireless link according to the coordinated schedulable resource message.

The present disclosure also proposes an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to: receive, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message; and schedule the interfering wireless link according to the coordinated schedulable resource message.

The present disclosure further proposes an apparatus for coordinating resource scheduling between two or more wireless networks which operate on same or overlapping radio resources, wherein each wireless network comprises one or more radio access nodes and one or more terminal devices connected thereto, the apparatus comprising processing means adapted to receive a resource coordination request message from at least one wireless network, wherein the resource coordination request message includes identifiers of at least one pair of wireless links which include an interfered wireless link in the at least one wireless network and an interfering wireless link in a second wireless network; perform coordination about schedulable resources for the interfered wireless link and the interfering wireless link based on the resource coordination request message; transmit a coordinated schedulable resource message to the at least one wireless network and the second wireless network such that at least one of the interfered wireless link and the interfering wireless link is scheduled according to the coordinated schedulable resource message. In an embodiment, the processing means herein comprise a processor and a memory and wherein the memory contains instructions executable by the processor.

The present disclosure additionally proposes an apparatus for coordinating resource scheduling between two or more wireless networks which operate on same or overlapping radio resources, wherein each wireless network comprises one or more radio access nodes and one or more terminal devices connected thereto, the apparatus comprising processing means adapted to: transmit a resource coordination request message to a central coordination node, wherein the resource coordination request message includes identifiers of at least one pair of wireless links which include an interfered wireless link in the wireless network and an interfering wireless link in a second wireless network; receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message; and schedule the interfered wireless link according to the coordinated schedulable resource message. In an embodiment, the processing means herein comprise a processor and a memory and wherein the memory contains instructions executable by the processor.

The present disclosure also proposes an apparatus for coordinating resource scheduling between two or more wireless networks which operate on same or overlapping radio resources, wherein each wireless network comprises one or more radio access nodes and one or more terminal devices connected thereto, the apparatus comprising processing means adapted to: receive, from a central coordination node, a coordinated schedulable resource message in response to a resource coordination request message, wherein the coordinated schedulable resource message is received from the central coordination node performing coordination about schedulable resources for an interfered wireless link and an interfering wireless link based on the resource coordination request message; and schedule the interfering wireless link according to the coordinated schedulable resource message. In an embodiment, the processing means herein comprise a processor and a memory and wherein the memory contains instructions executable by the processor.

Each apparatus as proposed above could be embodied as the apparatus 1300 discussed with reference to FIG. 13, and therefore the at least one processor, the at least one memory, and computer program code could be equally embodied as the processor 1301, memory 1302 and program 1303, respectively.

Further, according to different implementation manners, the present disclosure also provides a computer program, comprising instructions which, when executed on at least one processor, e.g., the processor 1301, cause the at least one processor to carry out the method according to any one of claims 1 to 12 as attached in the following claims.

In addition, the present disclosure provides a carrier containing the computer program as mentioned above, wherein the carrier is one of an electronic signal, optical signal, radio signal, or computer readable storage medium.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g., procedures, functions, and so on) that perform the functions described herein.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for use in a central coordination node for coordinating resource scheduling between two or more wireless networks which operate on same or overlapping radio resources, wherein each wireless network comprises one or more radio access nodes and one or more terminal devices connected thereto, the method comprising:
   receiving a resource coordination request message from at least one wireless network, wherein the resource coordination request message includes identifiers of at least one pair of wireless links which include an interfered wireless link in the at least one wireless network and an interfering wireless link in a second wireless network;
   performing coordination about schedulable resources for the interfered wireless link and the interfering wireless link based on the resource coordination request message; and
   transmitting a coordinated schedulable resource message to the at least one wireless network and the second wireless network such that at least one of the interfered wireless link and the interfering wireless link is scheduled according to the coordinated schedulable resource message.

2. The method according to claim 1, wherein the receiving the resource coordination request message comprises receiving the resource coordination request message when interference caused by the interfering wireless link on the interfered wireless link exceeds a pre-determined threshold.

3. The method according to claim 1, wherein the coordinated schedulable resource message indicates which radio resources are schedulable to at least one of the interfered wireless link and the interfering wireless link and wherein the radio resources schedulable to the interfered wireless link and the radio resources schedulable to the interfering wireless link are at least partially orthogonal to each other.

4. The method according to claim 1, wherein the performing coordination about the schedulable resources comprises:
updating previously-stored link pair information by adding the identifier of at least one of the interfered wireless link and the interfering wireless link; and
determining the coordinated schedulable resources based on the updated link pair information.

5. The method according to claim 4, wherein the determining the coordinated schedulable resources comprises:
using the link pair information as inputs of a graph coloring algorithm to determine orthogonal schedulable resources for the interfered wireless link and the interfering wireless link; and
generating the coordinated schedulable resource message including identifiers of the wireless links and the wireless networks, a number of colors that the graph coloring algorithm needs to get the wireless links orthogonalized from each other and identifiers of the colors.

6. The method according to claim 1, wherein the performing the coordination comprises:
Transmitting respectively to the at least one wireless network and the second wireless network a coordinated resource release message to release the coordinated resources when the interference falls below the pre-determined threshold or the interference has not occurred for a pre-determined period of time.

7. A method for use in a wireless network for coordinating resource scheduling between two or more wireless networks which operate on same or overlapping radio resources, wherein each wireless network comprises one or more radio access nodes and one or more terminal devices connected thereto, the method comprising:
transmitting a resource coordination request message to a central coordination node, wherein the resource coordination request message includes identifiers of at least one pair of wireless links which include an interfered wireless link in the wireless network and an interfering wireless link in a second wireless network;
receiving, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message; and
scheduling the interfered wireless link according to the coordinated schedulable resource message.

8. The method according to claim 7, wherein the transmitting the resource coordination request message comprises transmitting the resource coordination request message when the interference caused by the interfering wireless link on the interfered wireless link exceeds a pre-determined threshold.

9. The method according to claim 7, wherein the coordinated schedulable resource message indicates which radio resources are schedulable to at least one of the interfered wireless link and the interfering wireless link and wherein the radio resources schedulable to the interfered wireless link and the radio resources schedulable to the interfering wireless link are at least partially orthogonal to each other.

10. The method according to claim 7, further comprising:
updating previously-stored resource scheduling information based on the coordinated schedulable resource message.

11. The method according to claim 7, further comprising:
transmitting to the central coordination node a resource release request message to release the coordinated schedulable resources when the interference falls below the pre-determined threshold or the interference has not occurred for a pre-determined period of time; and
scheduling the interfered wireless link according to a response to the resource release request message from the central coordination node.

12. An apparatus for coordinating resource scheduling between two or more wireless networks which operate on same or overlapping radio resources, wherein each wireless network comprises one or more radio access nodes and one or more terminal devices connected thereto, the apparatus comprising:
at least one processor;
at least one memory including computer program code,
wherein the at least one memory and the computer program code are configured to, with the at least one processor, cause the apparatus at least to:
receive a resource coordination request message from at least one wireless network, wherein the resource coordination request message includes identifiers of at least one pair of wireless links include an interfered wireless link in the at least one wireless network and an interfering wireless link in a second wireless network;
perform coordination about schedulable resources for the interfered wireless link and the interfering wireless link based on the resource coordination request message; and
transmit a coordinated schedulable resource message to the at least one wireless network and the second wireless network such that at least one of the interfered wireless link and the interfering wireless link is scheduled according to the coordinated schedulable resource message.

13. The apparatus according to claim 12, wherein the resource coordination request message is received when interference caused by the interfering wireless link to the interfered wireless link exceeds a pre-determined threshold.

14. The apparatus according to claim 12, wherein the coordinated schedulable resource message indicates which radio resources are schedulable to at least one of the interfered wireless link and the interfering wireless link and wherein the radio resources schedulable to the interfered wireless link and the radio resources schedulable to the interfering wireless link are at least partially orthogonal to each other.

15. The apparatus according to claim 12, wherein the at least one memory and the computer program code are further configured to, with the at least one processor, cause the apparatus to:
update previously-stored link pair information by adding the identifier of at least one of the interfered wireless link and the interfering wireless link; and
determine the coordinated schedulable resources based on the updated link pair information.

16. An apparatus for coordinating resource scheduling between two or more wireless networks which operate on same or overlapping radio resources, wherein each wireless network comprises one or more radio access nodes and one or more terminal devices connected thereto, the apparatus comprising:

at least one processor;

at least one memory including computer program code, wherein the at least one memory and the computer program code are configured to, with the at least one processor, cause the apparatus at least to:

transmit a resource coordination request message to a central coordination node, wherein the resource coordination request message includes identifiers of at least one pair of wireless links which include an interfered wireless link in the wireless network and an interfering wireless link in a second wireless network; and receive, from the central coordination node, a coordinated schedulable resource message in response to the resource coordination request message, wherein the coordinated schedulable resource message is received from the central coordination node performing coordination about schedulable resources for the interfered wireless link and the interfering wireless link based on the resource coordination request message; and schedule the interfered wireless link according to the coordinated schedulable resource message.

17. The apparatus according to claim 16, wherein the at least one memory and the computer program code are further configured to, with the at least one processor, cause the apparatus to transmit the resource coordination request message when interference caused by the interfering wireless link to the interfered wireless link exceeds a predetermined threshold.

18. The apparatus according to claim 16, wherein the coordinated schedulable resource message indicates which radio resources are schedulable to at least one of the interfered wireless link and the interfering wireless link and wherein the radio resources schedulable to the interfered wireless link and the radio resources schedulable to the interfering wireless link are at least partially orthogonal to each other.

* * * * *